March 16, 1965 J. S. ELBOGEN ETAL 3,173,441
FUELING CONTROL MEANS
Filed Aug. 8, 1961 2 Sheets-Sheet 2
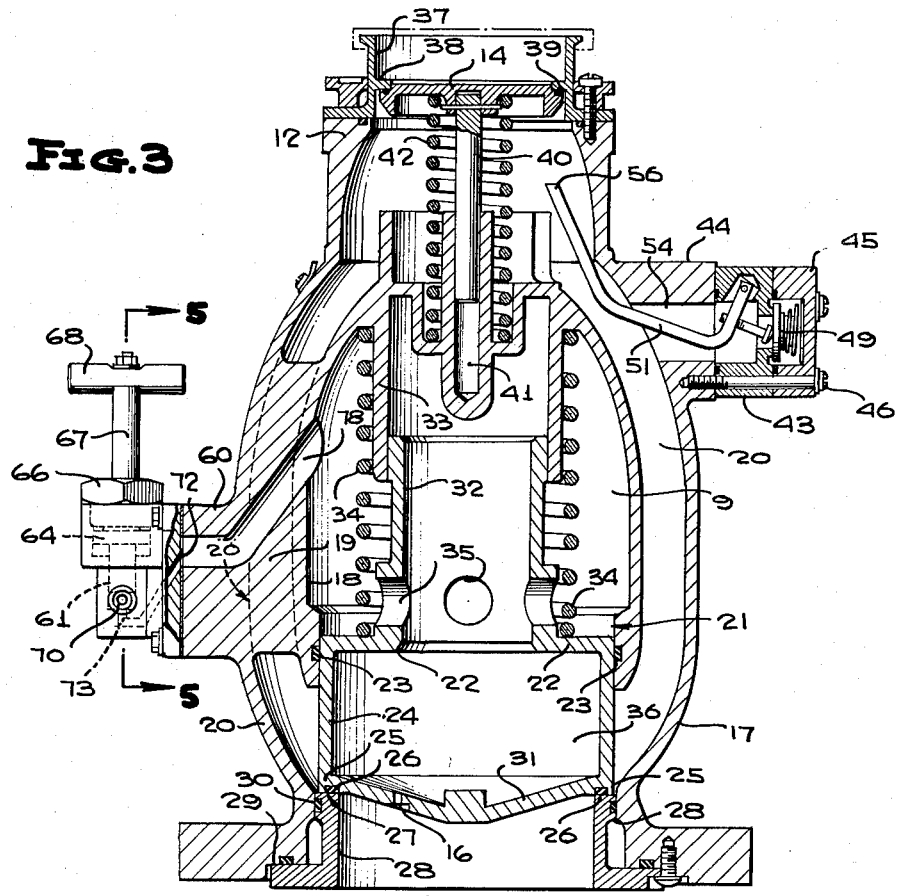
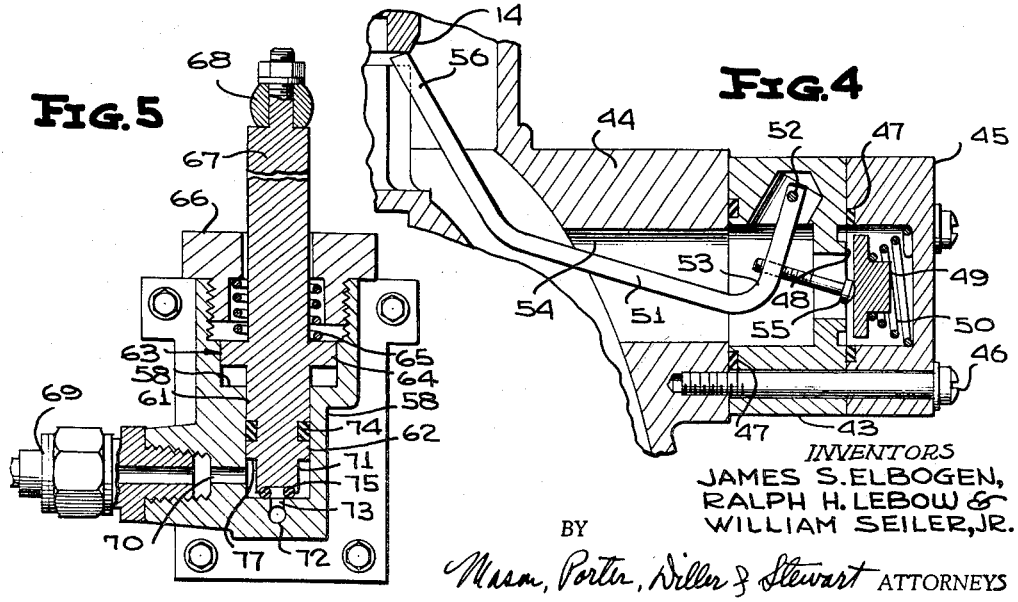
INVENTORS
JAMES S. ELBOGEN,
RALPH H. LEBOW &
WILLIAM SEILER, JR.
BY Mason, Porter, Diller & Stewart ATTORNEYS

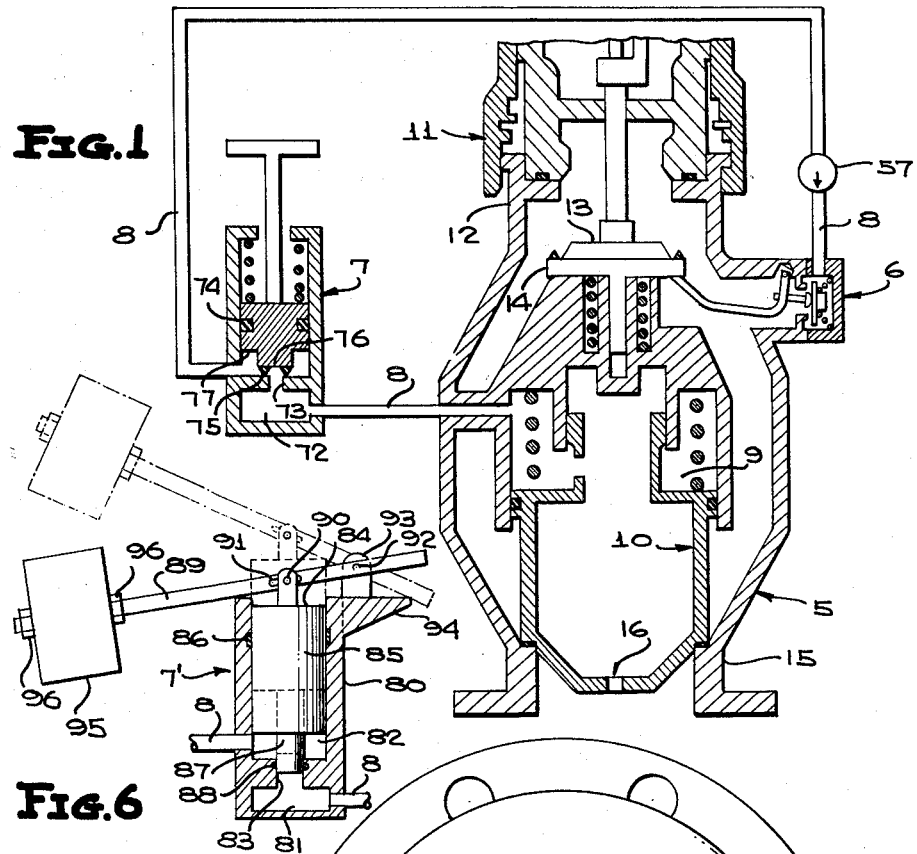
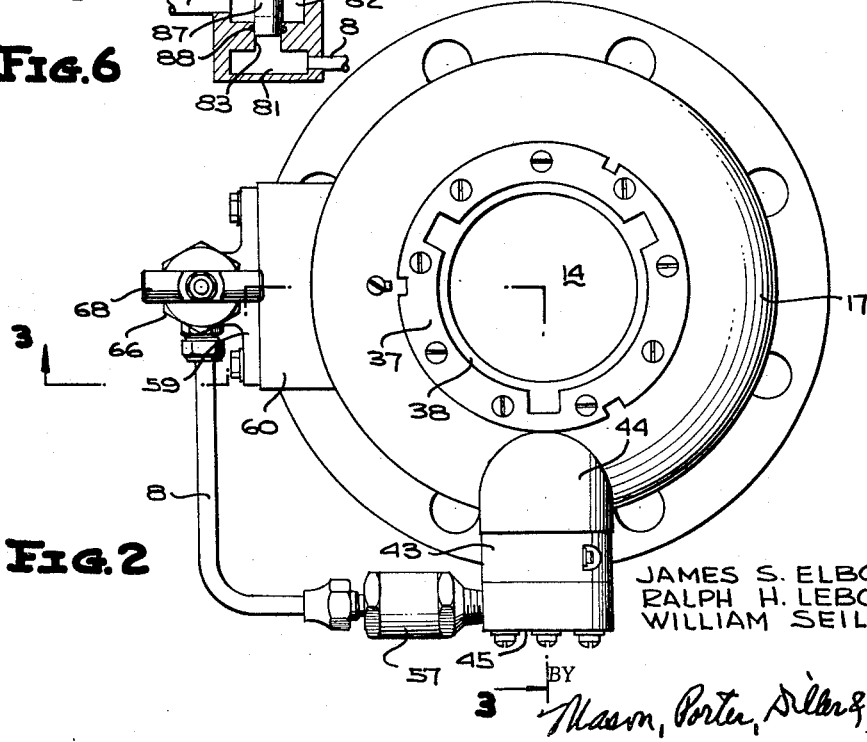

United States Patent Office 3,173,441
Patented Mar. 16, 1965

3,173,441
FUELING CONTROL MEANS
James S. Elbogen, Encino, Ralph H. Lebow, Pacific Palisades, and William Seiler, Jr., Los Angeles, Calif., assignors to Parker-Hannifin Corporation, Cleveland, Ohio, a corporation of Ohio
Filed Aug. 8, 1961, Ser. No. 130,154
26 Claims. (Cl. 137—220)

The invention relates generally to fueling control means and primarily seeks to provide an improved control means for this or similar purposes wherein provision is made for automatically discontinuing the delivery of the fuel upon the happening of some emergency such as the rupturing or disconnection of a fuel delivering line, or breakage or displacement of a part connecting such a line to the control means.

It is quite common to deliver liquid fuel to planes from tank trucks or from underground hydrants connected with storage tanks, and it is also known to employ in such fueling valve means including an inlet for receiving the supply of fuel, an outlet for delivering the fuel through a coupler and a connected hose line to the plane tank, a pressure chamber, a valve piston movable in the chamber and seatable in the inlet and exposed at one side to inlet pressure and at the other side to pressure of fuel entering the chamber through a restricted opening in the valve piston and accumulating in the chamber and normally dominant to hold the valve seated. Such controls include means for bleeding pressure from the pressure chamber, thereby to make inlet pressure at the valve means inlet effective to unseat the valve piston and permit fuel to flow through the valve means and into the coupled fueling line. It is a purpose of the present invention to provide novel fuel delivery control means including novel means for controlling the bleeding of pressure from the pressure chamber.

Control valve means of the character stated sometimes include a poppet valve spring seated at the outlet and which is displaceable to an open position incidental to the coupling of a fuel delivery line to the valve outlet. An object of the present invention is to provide novel pilot valve means operable by movement of the poppet valve to its fully open position to permit the bleeding of pressure from the pressure chamber and bring about the desired opening of the valve piston and delivery of the fuel.

Another object of the invention is to provide novel means for actuating the pilot valve incidental to a limited amount of movement of the poppet valve approaching its fully open position, thereby to assure a closing of the pilot valve and discontinuance of fuel flow upon happening of any malfunction or breakage of parts which would permit even a limited movement of the poppet valve from its fully open position toward its seat.

Another object of the invention is to provide plane fueling or other liquid flow controlling means of the character stated wherein there are included means other than the poppet valve controlled pilot valve for discontinuing the pressure bleeding from the pressure chamber and, as a result, also the delivery of the fuel.

Another object of the invention is to provide flow controlling means of the character stated wherein the said other means for discontinuing the pressure bleeding comprises a manually operable shut-off valve.

A further object of the invention is to provide flow controlling means of the character stated wherein said shut off valve is spring seated but movable manually toward or from its seat, and when seated presents a pressure area to chamber pressure too small to permit unseating of the valve by chamber pressure, but when unseated presents a larger area to bleeding chamber pressure sufficient to hold the shut-off valve unseated against the action of its spring, said spring having a value sufficient to seat the shut-off valve and bring about chamber pressure build up, valve piston seating and fuel flow stoppage in response to a predetermined pressure drop downstream of the valve piston and resulting from an emergent condition such as a line rupture, breakage or disconnection of a coupling means.

A still further object of the invention is to provide a flow controlling means of the character stated wherein the initiation and discontinuance of liquid flow, either wholly manually, or manually in part or automatically in part, is accomplished by combination of two pilot valves connected in series with the pressure chamber, one mechanically controlled as to opening and closing by movement of the poppet valve to and from its fully open position, and the other one of which is actuated manually to open or closed positions, automatically held open by chamber pressure after a manual opening, and spring closed automatically in response to a predetermined pressure drop down stream of the valve piston due to an emergent condition.

With the above and other objects in view that will hereinafter appear, the nature of the invention will be more clearly understood by reference to the following detailed description, the appended claims and the several views illustrated in the accompanying drawings.

In the drawings:

FIGURE 1 is a schematic view illustrating the main valve means and the series connection of the first and second pilot valve means and the valve pressure chamber, a delivery line coupler and the incidental opening of the poppet valve and the first pilot valve also being illustrated.

FIGURE 2 is a plan view illustrating the control valve arrangement.

FIGURE 3 is a vertical cross sectional view through the main valve structure along the lines 3—3 of FIGURE 2, the poppet valve being shown in its closed or seated position and the first and second pilot valves being shown in elevation.

FIGURE 4 is an enlarged fragmentary sectional view showing the first pilot valve in its open position.

FIGURE 5 is an enlarged detail vertical cross section through the second pilot valve taken on the line 5—5 of FIGURE 3.

FIGURE 6 is a cross sectional view of an alternate form of the second pilot valve.

In the example of embodiment of the invention herein disclosed, the improved fuel delivery control means is schematically illustrated in FIGURE 1 wherein the main valve is generally designated 5, the first pilot valve is generally designated 6, and the second pilot valve is generally designated 7. As schematically illustrated, the first and second pilot valves 6 and 7 are serially connected by conduit means 8 together with the pressure chamber 9 in which the valve piston generally designated 10 is slidably mounted.

A delivery line connecting coupler generally designated 11 is shown connected to the main valve outlet 12. The coupler 11 may be of any suitable form but preferably is of the type shown in FIGURE 2 of the Davies Patent 2,630,822. A coupler of the type of Davies patent includes a valve element which is projectable and retractable by manipulation of a handle device, and this projectable and retractable element is indicated at 13 in FIGURE 1, the same being in its projected position and engaged with the main valve poppet which is generally designed 14. In the illustrated arrangement, it will be apparent that the main valve poppet 14 is thus displaced from its closing position to a lowered or fully open position incidental to the application of the coupler and the projection of the valve thereof into position for admitting fuel delivered through the open poppet valve and into the delivery line which is to be understood as being connected with the coupler 11 at one end and with a tank of the plane to be fueled at its other end.

The main valve includes an inlet 15, and the previously mentioned valve piston generally designated 10 which closes of said inlet, or, when opened, permits flow of fuel through said inlet, has a bleed orifice 16 therein which provides for communication of fuel from the inlet into the interior of the valve piston for a purpose to be described in detail hereinafter.

The main valve includes a housing 17 wherein is provided a central cylindrical body 18 in which the pressure chamber 9 is provided, said body being carried on supporting webs 19 so as to be spaced within the housing and provide fuel passages 20 thereabout and leading to the housing outlet 12.

The central cylindrical body 18 of the housing provides a sliding guide at 21 for the intermediate body portion 22 of the valve piston generally designated 10, said intermediate body portion being grooved to carry an O-ring seal engaged with the slide guide 21. Alternatively, the O-ring seal may be in a groove in the valve piston 10 in sealing engagement with the slide guide, as is shown in FIGURE 1. The valve piston 10 also includes a depending cylindrical portion 24 which terminates in a seating shoulder 25 having a seal 26 and being seatable on an annular seat 27 formed on the seat ring 28 which is mounted in the lower portion of the housing at 29. The seating ring is sealed in the housing against leakage as at 30. The lower portion of the valve piston also has a depending pressure head portion 31 wherein the previously mentioned inlet pressure bleeding orifice 16 is formed.

The valve piston also is equipped with an upwardly extending tubular portion 32 which is slide guided in the depending tubular guide 33 provided in the upper portion of the housing. A compression spring 34 interposed between the upper portion of the housing and the upper face of the intermediate body portion 22 of the valve piston and surrounding the tubular guide 33 constantly urges the valve piston toward its seated position illustrated in FIGURE 3. It will be apparent by reference to FIGURE 3 that the tubular extension 32 from the valve piston is provided with openings 35 which communicate between the hollow interior 36 of the valve piston and the pressure chamber 9 which surrounds said extension 32. Thus fuel bleeding into the hollow interior 36 of the valve piston through the orifice 16 can pass out into the pressure chamber 9 for a purpose to be described in detail hereinafter.

At the housing outlet 12 a coupler ring 37 is mounted, said ring having the usual provision thereon for quick coupling of the coupler 11 previously referred to. The coupler ring 37 also is equipped with an annular seat 38 enageable by the closure poppet 14 which carries a sealing ring 39 for sealing engagement with said seat. A stem 40 depends from the popplet 14 and is slide guided at 41 in the housing, a compression spring 42 encircling the guide 41 between the housing and the underface of the poppet serving to constantly urge the poppet toward its seat.

The first pilot valve generally designated 6 includes a seat ring 43 which is held in place against the housing boss 44 by the cap 45 and the mounting screws 46. Suitable seals 47 are interposed between the ring 43 and cap 45, and between said ring and housing boss 44 in order to prevent leakage of fuel at this point.

The ring 43 provides a seat 48 for the button-like disk valve 49 which is spring seated at 50. An actuator lever arm 51 is pivotally supported at 52 on the seat ring 43 and is angle bent at 53 to extend freely through the housing boss opening 54, as clearly illustrated in FIGURE 3. The angle bent portion of the actuator lever arm carries a threadably adjustable actuator head 55 in position to engage the disk valve as shown in FIGURES 3 and 4. The inner end extremity 56 of the actuator lever arm 51 projects into position for being engaged and displaced downwardly each time the poppet valve 14 is moved downwardly from its outlet sealing position illustrated in FIGURE 3 to its fully open position illustrated in FIGURE 4. The parts are so constructed and cooperatively arranged that the end extremity 56 of the actuator lever arm 51 is engaged by the downwardly moving poppet valve only during the small portion of the travel completing the movement to the fully open position, and even this small amount of final movement downwardly of the poppet valve is compounded by the long lever arrangement to displace the disk valve 49 from its fully closed position shown in FIGURE 3, to its fully opened position shown in FIGURE 4. The previously mentioned series connecting conduit means 8 connects with the cap 45 of the first pilot valve and the chamber therein outward of the valve disk 49, and there is a check valve 57 in the conduit means 8 to prevent backflow of fuel from pilot valve 6 to pilot valve 7.

The second pilot valve generally designated 7 includes a casing 58 which is mounted at 59 on the housing boss 60. The casing has a bore 61 in which the main body 62 of the valve plunger is reciprocable, and a counterbore or enlargement 63 in which the plunger head 64 is movable in opposition to the compression spring 65 engaged with said head and with the back-up nut 66 through which the manually manipulatable stem 67 is projected. The stem 67 has a finger grip end portion 68 secured thereon in order to facilitate manual manipulation of the second pilot valve.

The series connecting duct or conduit 8 from the first pilot valve generally designated 6 is connected at 69 to the second pilot valve casing, as best shown in FIGURE 5, said duct entering the casing bore 61, as at 70, opposite the reduced diameter lower end extremity 71 of the valve body 62. The connection of the ducting generally designated 8 with the housing pressure chamber 9 is through a casing duct portion 72 and the connecting housing passage leading to said chamber 9 as illustrated in FIGURE 3. The casing duct portion 72 includes a portion 73 opening axially into the casing bore 61, as best shown in FIGURES 3 and 5.

A seal 74 is provided between the valve body 62 and the casing bore 61 in which it is slidable, and an annular seal 75 is provided at the end extremity of said valve body in position for surrounding the axial duct extension 73. This particular arrangement of parts, best illustrated in FIGURES 3 and 5, serves to provide a small diameter pressure area 76 over the axial duct portion 73 and which is opposed to pressure at said axial duct portion 73 tending to force the valve body 62 upwardly or to its open position. When the valve plunger has been lifted to an open position, however, a much larger pressure area is provided to be effective in holding the valve open against the action of the spring 65 once the valve has been opened, the larger pressure area now constituting the shoulder area 77 and the whole end surface of the reduced diameter end extremity 71 of the valve body 62. The passage in the valve housing communicating between the pressure chamber 9 and the casing duct portion 72 is indicated at 78 in FIGURE 3.

In describing the operation, of the herein disclosed fuel delivery control means, the part positioning illustrated in FIGURE 3 will be assumed, the poppet valve 14 being closed, and it being assumed also that the valve inlet 15 is connected to a source of fuel supply.

By connecting the fuel delivery line coupler 11 at 37 in the usual manner, as schematically illustrated in FIGURE 1, and by manipulating the handle of the coupler to project the valve element 13 thereof in the manner well known in the art, the poppet valve 14 will be forced to its fully open position, against the action of its closing spring 42. During the last small portion of the movement of the poppet valve 14 to its fully open position, it will contact the end extremity 56 of the actuator lever arm 51 and bring about an opening of the first pilot valve by displacement of the valve disk 49 from its seat as illustrated in FIGURE 4. This opens the series communicating ducting 8 to communication with the interior of the valve housing at the outlet 12. Liquid fuel under inlet pressure has bled through the orifice 16 into the interior 36 of the valve piston 10 and into the pressure chamber 9, but is ineffective against the very small area exposed over the axial duct portion 73 to bring about a lifting or opening of the valve body 62 of the second pilot valve generally designated 7. With the pilot valve generally designated 6 now moved into its open condition incidental to the attachment of the coupler 11 and the full opening of the poppet valve 14 by the coupler element 13, the second pilot valve is now manually operated to initiate fuel flow into the delivery line attached to the coupler 11. As the valve plunger is lifted by manipulation of the stem 67 and its finger grip portion 68 the seal at 75 will be broken and pressure from the pressure chamber 9 will be bled off through 78, 72, 73, 70, 69 and the ducting 8, and through the open first pilot valve 6, as viewed in FIGURE 4, into the outlet 12. This release of pressure from the chamber 9 will permit inlet pressure at 15 to lift the valve piston 10 and the liquid fuel will pass in through the passageways 20 and out through the open poppet valve 14 into the delivery line.

The delivery of fuel can be discontinued at any time by manual closing of the second pilot valve 7, by mere depression of the valve body 62. Pressure in the ducting 8 and acting against the larger pressure area composed of the full diameter of the valve body 62 has been effective to hold the second pilot valve open against the action of its spring 65, but the valve can be manually closed against such pressure, and when so closed, the pressure directed against the small end extremity area through the axial duct portion 73 and within the seal 75 will be ineffective to lift or open the valve.

In the event of any emergent condition which would provide a predetermined pressure drop, say to 25 p.s.i., downstream of the valve piston 10, such as a delivery line breakage, a coupling means breakage or displacement, or any malfunction, the spring 65 in the second pilot valve 7 would become effective to seat or close the valve and bring about a discontinuance of the delivery of fuel. In other words, this closing of the second pilot valve would cause pressure of fuel entering through the orifice 16 in the valve piston to accumulate in the pressure chamber and become effective to seat or close the valve piston as shown in FIGURE 3.

It will be apparent that the first pilot valve generally designated 6 also acts as a safety means in that the parts are so arranged that only a very small displacement of the actuator lever arm is required to bring about a full opening of the valve. Thus, a very small or limited movement of the poppet valve away from its lever depressing, fully open position, such as might be occasioned by part breakage, or displacement of any coupling means, would be sufficient to bring about a closing of the first pilot valve and a resulting building up of pressure in the pressure chamber effective to close or seat the valve piston and shut off the inflowing of fuel in the manner previously described.

FIGURE 6 shows an alternate form for second pilot valve 7, and is generally designated 7'. It includes a body 80 having a lower chamber 81 which may be connected by pipe 8 to chamber 9 of main valve 5 and a cylindrical upper chamber 82 which may be connected to first pilot valve 6 by pipe 8. Between chambers 81 and 82 is a cylindrical bore 83. A valve element 84 is mounted within the body, the upper end 85 of the valve element is cylindrical and a slide fit within cylindrical chamber 82 and is sealed by packing 86. The lower end 87 is of reduced diameter to fit within bore 83 and is sealed by packing 88 when within such bore.

The upper end of valve element 84 is attached to an arm 89 by a pivot pin 90 passing through an elongated opening 91 in arm 89. Arm 90 is also pivotally mounted by means of pin 92 to a bracket 93 fixed to body 80. Another bracket 94 on body 80 is for limiting movement of arm 89. Attached to arm 89 is a weight 95.

When weight 95 is in its downward position, cylindrical portion 87 is within bore 83 and blocks flow through the valve, pressure of fluid in chamber 81 acting on the relatively small end area of portion 87 being insufficient to lift weight 95. When weight 95 is manually lifted to the dotted position shown, cylindrical portion 87 is raised out of bore 83 to permit flow of fluid from chamber 81 to chamber 82 and thence to pilot valve 6. At this time pressure of fluid in chamber 82 acting on lower end of cylindrical portion 85, as well as on the lower end of portion 87, keeps weight 95 in its upper position until weight 95 is manually returned to its lower position, at which time cylindrical portion 87 again enters bore 83 to shut off flow through pipes 8. In this closed position the lower end of cylindrical portion 87 extends a distance below packing 88. If, while weight 95 is up and pilot valve 7' is open, delivery of fuel through outlet 12 of the main valve is stopped, as by closure of a regulator or other control valve, not shown, downstream of outlet 12, the fuel within the pilot system, that is, within pilot valves 6 and 7' and line 8, will be at delivery pressure. Such pressure acts on the lower end of cylindrical portion 85 of valve element 84 to maintain the latter open until it is closed by manual lowering of weight 95. The fuel at the lower end of cylindrical portion 85 will at this time be at delivery pressure and will continue to exert pressure on the lower end of cylindrical portion 85 while valve element 84 is manually held to its lowermost position, but upon release of the manual force such pressure will raise valve element 84 slightly so as to relieve the pressure of that portion of the fuel between check valve 57, which is now closed, and pilot valve 7' but without withdrawing the reduced diameter portion 87 from sealing contact with packing 88. Thus valve element 84 will remain closed until it is again opened manually.

It will also be understood that weight 95 will cause automatic closing of valve element 84 in the event of a drop in pressure of the fluid in chamber 81. The position of weight 95 on arm 89, and hence, the closing force it exerts on valve 84, may be adjusted by means of threaded nuts 96, or weight 95 may be replaced by a lighter or heavier weight for this purpose.

While a preferred arrangement of parts illustrating the invention is disclosed herein, it is to be understood that variations in the structure and arrangement of parts may be made without departing from the scope of the invention as defined in the appended claims.

We claim:

1. Fuel delivery control means for controlling delivery of fuel to planes or the like, said means comprising a valve housing having an inlet for connection with a source of fuel supply, an outlet for connection with a coupler delivering toward the plane, a poppet valve seatable in said outlet to prevent fuel delivery and movable to a fully open position incidental to a coupler connection for delivery of fuel through said outlet, means in said housing providing a pressure chamber, a valve piston movable in said chamber and seatable in said inlet so as to be exposed at one side to inlet pressure and at its other side to pressure within said chamber, said piston having a bleed opening therein to communicate inlet pressure into said chamber, a first pilot valve means, a second pilot valve means, conduit means connecting said first and second pilot valve means in series for at times opening communication between the outlet and said pressure chamber and for at times closing off said last named communication, means for automatically opening and holding open the first pilot valve means coincident with the opening of the poppet valve, and means for opening the second pilot valve to bleed pressure from the chamber to the outlet so that inlet pressure will be dominant and unseat the valve piston to deliver fuel past the valve piston and through the outlet past the open poppet valve, and means for automatically closing said second pilot valve responsive to a predetermined pressure drop downstream of said valve piston to discontinue said pressure bleeding and cause pressure build up in the chamber effective to close the valve piston on its seat.

2. An arrangement as defined in claim 1 wherein the means for opening the first pilot valve comprises an element mechanically actuated by movement of the poppet valve to its open position.

3. An arrangement as defined in claim 1 wherein the first pilot valve is spring seated and the means for opening said first pilot valve comprises an actuator arm engaging said first pilot valve and depressible by contact of the poppet valve as it moves to its open position.

4. An arrangement as defined in claim 1 wherein the first pilot valve is spring seated and the means for opening said first pilot valve comprises an actuator arm engaging said first pilot valve and depressible by contact of the poppet valve as it moves to its open position, said poppet valve movement being effective to open the first pilot valve during only a limited last portion of the movement of the poppet valve toward its fully open position, and said poppet valve being spring seated whereby limited return of the poppet valve from its fully open position by reason of any malfunction or part breakage will bring about a closing of said first pilot valve.

5. An arrangement as defined in claim 1 wherein the first pilot valve comprises a spring seated disk and the means for opening said first pilot valve comprises a pivotally mounted actuator arm having thereon a threadably adjustable contact member engaged with said disk, said arm being engageable and movable by the poppet valve as it moves to its fully open position.

6. An arrangement as defined in claim 1 wherein the means for opening the second pilot valve to initiate the pressure bleeding from the chamber comprises a manually operable valve unseating means, said last named valve being spring seated and when so seated presenting a pressure area to chamber pressure too small to permit unseating by chamber pressure but when unseated presenting a larger area to pressure bleeding from the chamber sufficient to hold the second pilot valve open against the action of its seating spring, and said last named spring comprising the means for automatically closing the second pilot valve responsive to pressure drop.

7. An arrangement as defined in claim 1 wherein the means for opening the second pilot valve to initiate the pressure bleeding from the chamber comprises a manually operable valve unseating means, said last named valve being spring seated and when so seated presenting a pressure area to chamber pressure too small to permit unseating by chamber pressure but when unseated presenting a larger area to pressure bleeding from the chamber sufficient to hold the second pilot valve open against the action of its seating spring, said last named spring comprising the means for automatically closing the second pilot valve responsive to pressure drop, and wherein the first pilot valve is spring seated and the means for opening said first pilot valve comprises an actuator arm engaging said first pilot valve and depressible by contact of the poppet valve as it moves to its open position.

8. An arrangement as defined in claim 1 wherein the means for opening the second pilot valve to initiate the pressure bleeding from the chamber comprises a manually operable valve unseating means, said last named valve being spring seated and when so seated presenting a pressure area to chamber pressure too small to permit unseating by chamber pressure but when unseated presenting a larger area to pressure bleeding from the chamber sufficient to hold the second pilot valve open against the action of its seating spring, said last named spring comprising the means for automatically closing the second pilot valve responsive to pressure drop, and wherein the first pilot valve is spring seated and the means for opening said first pilot valve comprises an actuator arm engaging said first pilot valve and depressible by contact of the poppet valve as it moves to its open position, said poppet valve movement being effective to open the first pilot valve during only a limited last portion of the movement of the poppet valve toward its fully open position, and said poppet valve being spring seated whereby limited return of the poppet valve from its fully open position by reason of any malfunction or part breakage will bring about a closing of said first pilot valve.

9. An arrangement as defined in claim 1 wherein the means for opening the second pilot valve to initiate the pressure bleeding from the chamber comprises a manually operable valve unseating means, said last named valve being spring seated and when so seated presenting a pressure area to chamber pressure too small to permit unseating by chamber pressure but when unseated presenting a larger area to pressure bleeding from the chamber sufficient to hold the second pilot valve open against the action of its seating spring, said last named spring comprising the means for automatically closing the second pilot valve responsive to pressure drop, and wherein the first pilot valve is spring seated and the means for opening said first pilot valve comprises an actuator arm engaging said first pilot valve and depressible by contact of the poppet valve as it moves to its open position, said poppet valve movement being effective to open the first pilot valve during only a limited last portion of the movement of the poppet valve toward its fully open position, and said poppet valve being spring seated whereby limited return of the poppet valve from its fully open position by reason of any malfuction or part breakage will bring about a closing of said first pilot valve, and wherein the first pilot valve comprises a spring seated disk and the means for opening said first pilot valve comprises a pivotally mounted actuator arm having thereon a threadably adjustable contact member engaged with said disk, said arm being engageable and movable by the poppet valve as it moves to its fully open position.

10. Fuel delivery control means for controlling delivery of fuel to planes or the like, said means comprising a valve housing having an inlet for connection with a source of fuel supply, an outlet for connection with a coupler delivering toward the plane, a poppet valve seatable in said outlet to prevent fuel delivery and movable to a fully open position incidental to a coupler connection for delivery of fuel through said outlet, means in said housing providing a pressure chamber, a valve piston movable in said chamber and seatable in said inlet so as to be exposed at one side to inlet pressure and at its other side to pressure within said chamber, said piston having a bleed opening therein to communicate inlet pressure into said chamber, a first pilot valve means, a second pilot valve means, conduit means connecting said first and second pilot valve means in series for at times opening communication between the outlet and said pressure chamber and for at times closing off said last named communication, means responsive to the movement of the poppet valve for opening and holding open the first pilot valve means when the poppet valve is opened, and means for opening the second pilot valve to bleed pressure from the chamber to the outlet so that inlet pressure will be dominant and unseat the valve piston to deliver fuel past the valve piston and through the outlet past the open poppet valve, and means for automatically closing said second pilot valve responsive to a predetermined pressure drop downstream of said valve piston to discontinue said pressure bleeding and cause pressure build up in the chamber effective to close the valve piston on its seat, said second pilot valve means also being manually closable to discontinue pressure bleeding from the chamber and thus cause pressure build up in said chamber and a resultant seating and closing of the valve piston.

11. An arrangement as defined in claim 1 wherein the means for opening the second pilot valve to initiate the pressure bleeding from the chamber comprises a manually operable valve unseating means, said last named valve being spring seated and when so seated presenting a pressure area to chamber pressure too small to permit unseating by chamber pressure but when unseated presenting a larger area to pressure bleeding from the chamber sufficient to hold the second pilot valve open against the action of its seating spring, said last named spring comprising the means for automatically closing the second pilot valve responsive to pressure drop, and wherein the first pilot valve is spring seated and the means for opening said first pilot valve comprises an actuator arm engaging said first pilot valve and depressible by contact of the poppet valve as it moves to its open position, said second pilot valve means also being manually closable to discontinue pressure bleeding from the chamber and thus cause pressure build up in said chamber and a resultant seating and closing of the valve piston.

12. An arrangement as defined in claim 1 wherein the means for opening the second pilot valve to initiate the pressure bleeding from the chamber comprises a manually operable valve unseating means, said last named valve being spring seated and when so seated presenting a pressure area to chamber pressure too small to permit unseating by chamber pressure but when unseated presenting a larger area to pressure bleeding from the chamber sufficient to hold the second pilot valve open against the action of its seating spring, said last named spring comprising the means for automatically closing the second pilot valve responsive to pressure drop, and wherein the first pilot valve is spring seated and the means for opening said first pilot valve comprises an actuator arm engaging said first pilot valve and depressible by contact of the poppet valve as it moves to its open position, said poppet valve movement being effective to open the first pilot valve during only a limited last portion of the movement of the poppet valve toward its fully open position, and said poppet valve being spring seated whereby limited return of the poppet valve from its fully open position by reason of any malfunction or part breakage will bring about a closing of said first pilot valve, said second pilot valve means also being manually closable to discontinue pressure bleeding from the chamber and thus cause pressure build up in said chamber and a resultant seating and closing of the valve piston.

13. An arrangement as defined in claim 1 wherein the means for opening the second pilot valve to initiate the pressure bleeding from the chamber comprises a manually operable valve unseating means, said last named valve being spring seated and when so seated presenting a pressure area to chamber pressure too small to permit unseating by chamber pressure but when unseated presenting a larger area to pressure bleeding from the chamber sufficient to hold the second pilot valve open against the action of its seating spring, said last named spring comprising the means for automatically closing the second pilot valve responsive to pressure drop, and wherein the first pilot valve is spring seated and the means for opening said first pilot valve comprises an actuator arm engaging said first pilot valve and depressible by contact of the poppet valve as it moves to its open position, said poppet valve movement being effective to open the first pilot valve during only a limited last portion of the movement of the poppet valve toward its fully open position, and said poppet valve being spring seated whereby limited return of the poppet valve from its fully open position by reason of any malfunction or part breakage will bring about a closing of said first pilot valve, and wherein the first pilot valve comprises a spring seated disk and the means for opening said first pilot valve comprises a pivotally mounted actuator arm having thereon a threadably adjustable contact member engaged with said disk, said arm being engageable and movable by the poppet valve as it moves to its fully open position, said second pilot valve means also being manually closable to discontinue pressure bleeding from the chamber and thus cause pressure build up in said chamber and a resultant seating and closing of the valve piston.

14. Fuel delivery control means for controlling delivery of fuel to planes or the like, said means comprising a valve housing having an inlet for connection with a source of fuel supply, an outlet for connection with a coupler delivering toward the plane, a poppet valve seatable in said outlet to prevent fuel delivery and movable to a fully open position incidental to a coupler connection for delivery of fuel through said outlet, means in said housing providing a pressure chamber, a valve piston movable in said chamber and seatable in said inlet so as to be exposed at one side to inlet pressure and at its other side to pressure within said chamber, said piston having a bleed opening therein to communicate inlet pressure into said chamber, a pilot valve means, conduit means connecting said pilot valve means and said chamber whereby opening of said pilot valve means will open communication between the outlet and said chamber to bleed pressure from the chamber to the outlet so that inlet pressure will be dominant and unseat the valve piston to deliver fuel past the valve piston and through the outlet past the open poppet valve and closing of said pilot valve will close off said pressure bleeding communication and cause chamber pressure to build-up in the chamber and become effective to close the valve piston on its seat, means actuated by the poppet valve as it is moved to its fully open position to open said pilot valve, and means for closing the pilot valve as the poppet valve moves toward its closed position from its fully open position.

15. Fuel delivery control means for controlling delivery of fuel to planes or the like, said means comprising a valve housing having an inlet for connection with a source of fuel supply, an outlet for connection with a coupler delivering toward the plane, a poppet valve seatable in said outlet to prevent fuel delivery and movable to a fully open position incidental to a coupler connection for delivery of fuel through said outlet, means in said housing providing a pressure chamber, a valve piston movable in said chamber and seatable in said inlet so as to be exposed at one side to inlet pressure and at its other side to pressure within said chamber, said piston having a bleed opening therein to communicate inlet pressure into said chamber, a pilot valve means, conduit means connecting said pilot valve means and said chamber whereby opening of said pilot valve means will open communication between the outlet and said chamber to bleed pressure from the chamber to the outlet so that inlet pressure will be dominant and unseat the valve piston to deliver fuel past the valve piston and through the outlet past the open poppet valve and closing of said pilot valve will close off said pressure bleeding communication and cause chamber pressure to build-up in the chamber and become effective to close the valve piston on its seat, means actuated by the poppet valve as it is moved to its fully open position to open said pilot valve, means for closing the pilot valve as the poppet valve moves toward its closed position from its fully open position, and means other than said pilot valve means also being operable to close off said pressure bleeding communication independently of said pilot valve means.

16. An arrangement as defined in claim 15 wherein the means for closing the pilot valve comprises spring seating means and the means for opening the pilot valve comprises an actuator arm engaging the pilot valve and depressible by contact of the poppet valve as it moves to its open position, the poppet valve movement being effective to open the pilot valve during only a limited last portion of the movement of the poppet valve toward its fully open position, and said poppet valve being spring seated whereby limited return of the poppet valve from its fully open position by reason of any malfunction or part breakage will bring about a closing of the pilot valve.

17. An arrangement as defined in claim 15 wherein the means for closing the pilot valve comprises spring seating means and the means for opening the pilot valve comprises an actuator arm engaging the pilot valve and depressible by contact of the poppet valve as it moves to its open position, the poppet valve movement being effective to open the pilot valve during only a limited last portion of the movement of the poppet valve toward its fully open position, and said poppet valve being spring seated whereby limited return of the poppet valve from its fully open position by reason of any malfunction or part breakage will bring about a closing of the pilot valve, said pilot valve comprising a spring seated disk, and said actuator arm being pivotally mounted and having thereon a threadably adjustable contact member engaged with said disk.

18. An arrangement as defined in claim 15 wherein said means other than the pilot valve means comprises a second pilot valve connected in the conduit means and manually operable to initiate or discontinue the pressure bleeding communication.

19. An arrangement as defined in claim 15 wherein said means other than the pilot valve means comprises a second pilot valve connected in the conduit means and manually operable to initiate or discontinue the pressure bleeding communication, said second pilot valve being spring seated and when so seated presenting a pressure area to chamber pressure too small to permit unseating by chamber pressure but when unseated presenting a larger area to pressure bleeding from the chamber sufficient to hold the second pilot valve open against the action of its seating spring, and said last named spring being effective in response to a predetermined pressure drop downstream of the valve piston to automatically close the second pilot valve to discontinue pressure bleeding and cause pressure build up in the chamber effective to close the valve piston on its seat.

20. An arrangement as defined in claim 15 wherein said other means comprises a second pilot valve having a movable valve element with an area exposed to pressure of fuel downstream of said element for holding said element in open position, said element when in closed position being capable of a predetermined amount of movement in an opening direction without opening whereby said predetermined movement relieves pressure of downstream fuel on said area so as to avoid opening of said valve element thereby.

21. An arrangement as defined in claim 15 wherein said means comprises a second pilot valve having a body and a movable valve element, said element having a cylindrical portion telescopically receivable in a bore in said body for closing off flow of fuel through said second pilot valve and also having an area exposed to pressure of fuel downstream of said element for holding said element in open position, said element when in closed position being capable of a predetermined amount of movement in an opening direction without withdrawing said cylindrical portion from said bore whereby said predetermined movement relieves pressure of downstream fuel on said area so as to avoid opening of said valve element thereby.

22. An arrangement as defined in claim 15 in which said other means comprises a second pilot valve which includes a body and a movable valve element, said valve element having a cylindrical portion of relatively small diameter telescopically receivable in a bore in said body for closing off fuel flow through said second pilot valve, said cylindrical portion having a relatively small area exposed to pressure of fuel within said chamber and tending to move the valve element to open position with said cylindrical portion withdrawn from said bore, means exerting a predetermined closing force on said valve element, said valve element having a relatively larger area exposed to pressure of fuel downstream of said bore so as to exert an opening force on said valve element, said valve element being capable of a predetermined amount of movement in an opening direction without opening whereby such predetermined movement relieves the pressure of fuel downstream of said bore on said larger area while said valve element remains closed.

23. An arrangement in accordance with claim 21 in which said cylindrical portion is sealed within said bore by a packing ring.

24. An arrangement in accordance with claim 22 in which there is a means for adjusting the closing force exerted on said valve element.

25. An arrangement in accordance with claim 15 in which said other means is located between said chamber and said pilot valve means and there is a check valve in said conduit between said pilot valve and said other means and permitting flow of fuel through said conduit only in a direction from said other means toward said pilot valve means.

26. An arrangement in accordance with claim 20 in which there is a check valve between said pilot valves effective to prevent backflow of fuel from said pilot valve means to said second pilot valve whereby pressure upon said area due to such backflow is avoided.

References Cited in the file of this patent
UNITED STATES PATENTS

| 2,469,719 | Ford | May 10, 1949 |
| 2,674,260 | Thrush | Apr. 6, 1954 |
| 2,693,823 | Sogge | Nov. 9, 1954 |
| 2,919,714 | Mrazek | Jan. 5, 1960 |
| 2,943,636 | Reed | July 5, 1960 |

FOREIGN PATENTS

| 1,130,058 | France | Sept. 17, 1956 |
| 1,263,250 | France | May 2, 1961 |